(12) United States Patent
Schenk

(10) Patent No.: US 7,059,961 B2
(45) Date of Patent: Jun. 13, 2006

(54) APPARATUS AND METHOD FOR EFFECTING MOVEMENT AND CLEARANCE SPACING OF A CONCAVE

(75) Inventor: Charles R. Schenk, South Bend, IN (US)

(73) Assignee: CNH America LLC, New Holland, PA (US)

( * ) Notice: Subject to any disclaimer, the term of this patent is extended or adjusted under 35 U.S.C. 154(b) by 100 days.

(21) Appl. No.: 10/755,774

(22) Filed: Jan. 12, 2004

(65) Prior Publication Data

US 2005/0176483 A1    Aug. 11, 2005

(51) Int. Cl.
*A01F 12/28*    (2006.01)
(52) U.S. Cl. .......................... 460/109; 460/59
(58) Field of Classification Search ............... 460/109, 460/107, 108, 59, 62
See application file for complete search history.

(56) References Cited

U.S. PATENT DOCUMENTS

| | | | |
|---|---|---|---|
| 2,484,228 A * | 10/1949 | Isay | 460/46 |
| 2,500,675 A * | 3/1950 | Goodwin | 99/575 |
| 2,867,218 A * | 1/1959 | Moullec | 460/109 |
| 3,385,438 A | 5/1968 | Fisher | |
| 3,470,881 A | 10/1969 | Knapp et al. | |
| 3,593,719 A | 7/1971 | Islington et al. | |
| 3,631,862 A | 1/1972 | Rowland-Hill et al. | |
| 3,871,384 A | 3/1975 | Depauw et al. | |
| 3,889,761 A * | 6/1975 | Rogers | 172/706 |
| 4,330,000 A | 5/1982 | Peiler | |
| 4,375,221 A | 3/1983 | Bernhardt et al. | |
| 4,425,925 A | 1/1984 | Kersting et al. | |
| 4,712,568 A | 12/1987 | Strong et al. | |
| 4,718,434 A * | 1/1988 | Raineri | 460/75 |
| 4,738,270 A * | 4/1988 | Huhman et al. | 460/107 |
| 4,802,496 A | 2/1989 | Bennett | |
| 4,805,643 A | 2/1989 | Tetaka | |
| 4,897,072 A | 1/1990 | Bestland | |
| 5,041,059 A | 8/1991 | Ricketts et al. | |
| 5,395,287 A | 3/1995 | Coers | |
| 5,489,239 A * | 2/1996 | Matousek et al. | 460/62 |
| 5,919,087 A | 7/1999 | Strong et al. | |
| 6,182,737 B1 * | 2/2001 | Kuwabara | 160/84.06 |
| 6,358,142 B1 | 3/2002 | Imel et al. | |
| 6,443,835 B1 | 9/2002 | Imel et al. | |
| 6,485,364 B1 | 11/2002 | Gryspeerdt et al. | |
| 6,485,365 B1 | 11/2002 | Imel et al. | |
| 6,503,142 B1 | 1/2003 | Imel et al. | |
| 6,530,833 B1 | 3/2003 | Imel et al. | |

FOREIGN PATENT DOCUMENTS

EP    0841001    5/1998

* cited by examiner

*Primary Examiner*—Meredith Petravick
(74) *Attorney, Agent, or Firm*—Michael G. Harms; John William Stader; Stephen A. Bucchianeri

(57) ABSTRACT

A device and method is disclosed for effecting movement and extending the clearance spacing between a rotor of a combine and a concave to allow for easy removal of lodged material. The apparatus and method additionally provide a reduction in rotor actuation motor torque and an increase in rotor mechanical advantage. Finally, the apparatus and method provide a travel limit to prevent a concave from being raised into, and having contact with, a rotor of a combine.

29 Claims, 10 Drawing Sheets

APPARATUS AND METHOD FOR EFFECTING MOVEMENT AND CLEARANCE SPACING OF A CONCAVE

BACKGROUND OF THE INVENTION

Field of the Invention

The present invention relates generally to an apparatus and method for effecting movement and clearance spacing of a concave relative to the rotor of a combine and, more specifically, to an apparatus and method for providing easy removal of crop material lodged between a rotor and concave and for reducing rotor actuation motor torque and increasing rotor mechanical advantage.

Agricultural combines are well known in the art for harvesting and threshing a number of various agricultural crops, including for example corn, wheat, soybeans, etc. Typically, agricultural combines include a harvesting apparatus, an infeed mechanism, and a separating apparatus. In operation, the harvesting apparatus reaps the crop, which is planted in the ground. After reaping, the infeed mechanism feeds the crop to the separating apparatus.

Usually, the separating apparatus in a rotary combine includes a rotor, which can extend axially or transversely within the body of the combine, and which is surrounded at least in part by a perforated concave having a plurality of apertures. As shown for example in U.S. Pat. No. 5,489,239, titled "Rotary Combine" and issued Feb. 6, 1996 to Case Corporation, the same assignee as for the present application, the concave can include a series of concave inserts arranged in a side-by-side configuration, with each concave insert extending partially circumferentially around the rotor. Usually, it is desirable to provide for an adjustment of the concave, wherein the spacing between the concave and the rotor can be altered to provide for the threshing of different crops in different conditions and removal of lodged crop material.

For example, it is known to pivotally support one end of the concave about an axis, with the other end thereof having linkages that are adjustable for movement of the concave toward and away from the rotor as it pivots about the one end. However, such known linkages allow for only minimal clearance spacing between the concave and the rotor. This limited clearance spacing becomes undesirable when crop material becomes lodged in the area.

As a result, torque on the rotor actuation motor becomes excessive and the mechanical advantage of the rotor decreases. Consequently, mechanical disassembly, which can be a difficult and time-consuming undertaking, may be necessary to free the lodged material from the area between the rotor and the concave.

The drawbacks of the known apparatuses and methods for effecting movement and clearance spacing of a concave relative to the rotor of a combine have been known within the industry without any marked improvement to date. Thus, the need exists for the present invention, which provides an apparatus and method for extending the clearance spacing between a rotor and concave to allow for easy removal of lodged material. Additionally, increased clearance spacing reduces rotor actuation motor torque and increases rotor mechanical advantage.

It is accordingly the primary objective of the present invention that it provide a concave adjustment mechanism and method for effecting movement and clearance spacing of a concave relative to a rotor of a combine.

It is another objective of the present invention that it provide an adjustable rigid concave linkage when a concave is placed in a "fully closed position" and in a "clean-out position" and a flexible concave linkage when the concave is placed in a "fully opened position" (i.e. extended range).

It is yet another objective of the present invention that it provide an extended actuation range to allow for easy removal of lodged material between a concave and a rotor of a combine.

It is yet a further objective of the present invention that it decrease rotor actuation motor torque and increase rotor mechanical advantage.

It is an additional objective of the present invention that it provide a travel limit to prevent a concave from being raised into, and having contact with, a rotor of a combine.

The concave adjustment mechanism apparatus of the present invention must also be of a construction which is both durable and long lasting, and it should also require little or no maintenance to be provided by the user throughout its operating lifetime. In order to enhance the market appeal of the concave adjustment mechanism apparatus and method of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a concave adjustment mechanism and method for effecting movement and clearance spacing of a concave relative to a rotor of a combine is provided. Accordingly, the present invention is used in conjunction with a combine for harvesting crop grain material.

Generally, such combines include a mobile frame and a crop-threshing rotor, the rotor being supported by the frame. A concave is movably supported at least partially around the circumference of the rotor at a clearance spacing extending generally radially outward therefrom. Depending on the clearance spacing between the rotor and the concave, different types of crop grain material can be threshed therebetween.

In one embodiment of the present invention, the concave adjustment mechanism includes at least one rotatable shaft, at least one rotatable member mounted thereto for rotation therewith, and at least one linking assembly. The rotatable member defines a peripheral surface and is configured to couple with at least a portion of the linking assembly. The linking assembly preferably includes at least one flexible member and couples the rotatable member to the concave.

In another aspect of the present invention, the rotatable member includes a finger that extends radially outward with respect to an axis of the rotatable member's rotation. The finger is adapted to engage with the flexible member of the linking assembly.

In an additional aspect of the present invention, an actuation motor is coupled to the rotatable shaft for providing rotational force to the rotatable shaft and the rotatable member.

In yet another aspect of the present invention, the peripheral surface of the rotatable member is configured to receive at least a portion of the flexible member of the linking assembly. For example, the rotatable member is configured to index and draw the flexible member onto its peripheral surface upon rotation of the rotatable member from a "fully opened position" to a "fully closed position." Thus, in a preferred embodiment of the present invention, the rotatable member is a cam sprocket having a plurality of tines and the flexible member is a chain.

In yet another aspect of the present invention, the linking assembly further includes at least one rigid member for coupling the flexible member to the concave. The rigid member and the flexible member both include a first end and a second end. The first end of the flexible member is engaged with the rotatable member and the first end of the rigid member is engaged with the concave. The second end of the rigid member is engaged with the second end of the flexible member, thereby coupling the rotatable member to the concave.

In another embodiment of the present invention, the linking assembly further includes a generally triangular connection link, which is coupled to the second end of the flexible member. Thus, instead of coupling directly to the second end of the flexible member, the second end of the rigid member engages with, and couples to, the connection link.

In this embodiment, it is contemplated that both the connection link and the rotatable member include a locking aperture for securely receiving a locking member, such as a locking pin. Insertion of the locking pin into the locking apertures of the rotatable member and the connection link securely affixes the connection link to the rotatable member, thereby creating an adjustable rigid linkage between the rotatable member and the concave.

In yet an additional aspect of the present invention, the adjustment mechanism further includes a capturing device. The capturing device is non-rotatably mounted about the rotatable shaft and positioned adjacent to the rotatable member. It is contemplated that the capturing device includes a travel limit, such as a slot, which is configured to receive the aforementioned locking pin.

Upon receipt of the locking pin by the travel limit, further upward rotation of the rotatable member is prevented. In turn, the concave is also prevented from raising closer to, or coming into contact with, the rotor of the combine.

In a final aspect of the present invention, a method is provided for effecting movement and clearance spacing of a concave relative to a rotor of a combine. For example, in accordance with the aforementioned preferred embodiments of the present invention, the method includes providing a rotor having a longitudinal axis of rotation; providing at least one concave, the concave having a first and second end spaced circumferentially around the rotor, the first end of the concave being pivotally mounted about a first pivot axis, the second end of the concave releasably mounted to a concave adjustment mechanism; and actuating the rotatable shaft to effect movement and clearance spacing of the concave relative to the rotor of the combine.

The concave adjustment mechanism of the present invention is of a construction which is both durable and long lasting, and which will require little or no maintenance to be provided by the user throughout its operating lifetime. The concave adjustment mechanism apparatus of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
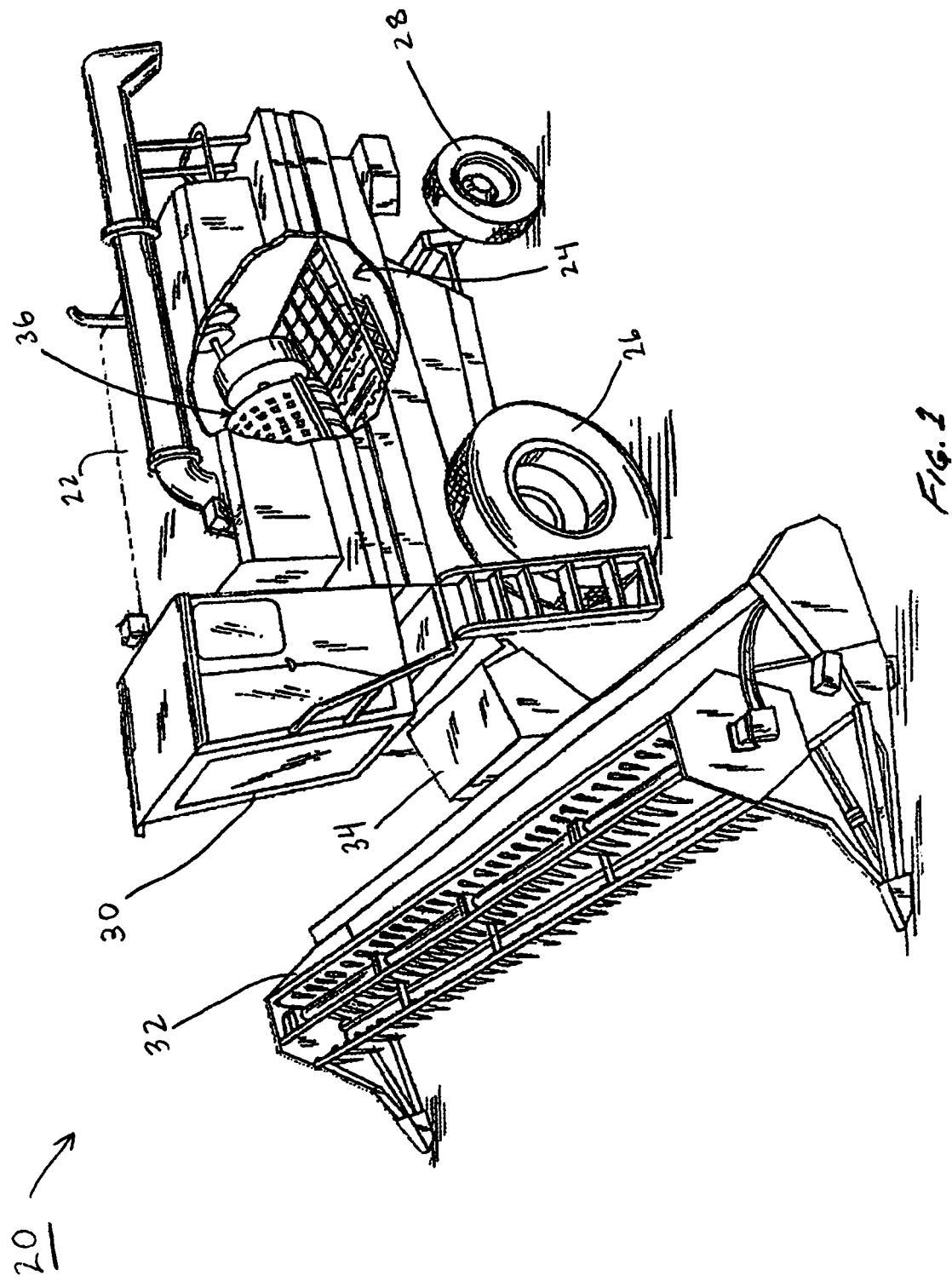
FIG. 1 is a perspective view, partially broken away, of an agricultural combine.

Referring to the drawings, FIG. 1 shows a conventional self-propelled rotary combine 20 that includes a housing or body 22 defining an internal open area or space 24. The body 22, which can include a supporting frame, is supported on front drive wheels 26 and steerable rear wheels 28. The combine 20 is powered by an engine (not shown) and controlled from an operator's station 30.

A crop harvesting apparatus 32, otherwise referred to as a header, and an infeed mechanism 34 are attached at a forward end of the combine 20. The infeed mechanism 34 feeds crop materials to a rotor assembly 36 enclosed within the body 22. One example of a rotary combine configured with a rotary assembly 36 is disclosed in U.S. Pat. No. 5,489,239, title "Rotary Combine," and which issued Feb. 6, 1996 to Case Corporation, the same assignee as the present application, and which is hereby incorporated herein by reference.

Figure 2:
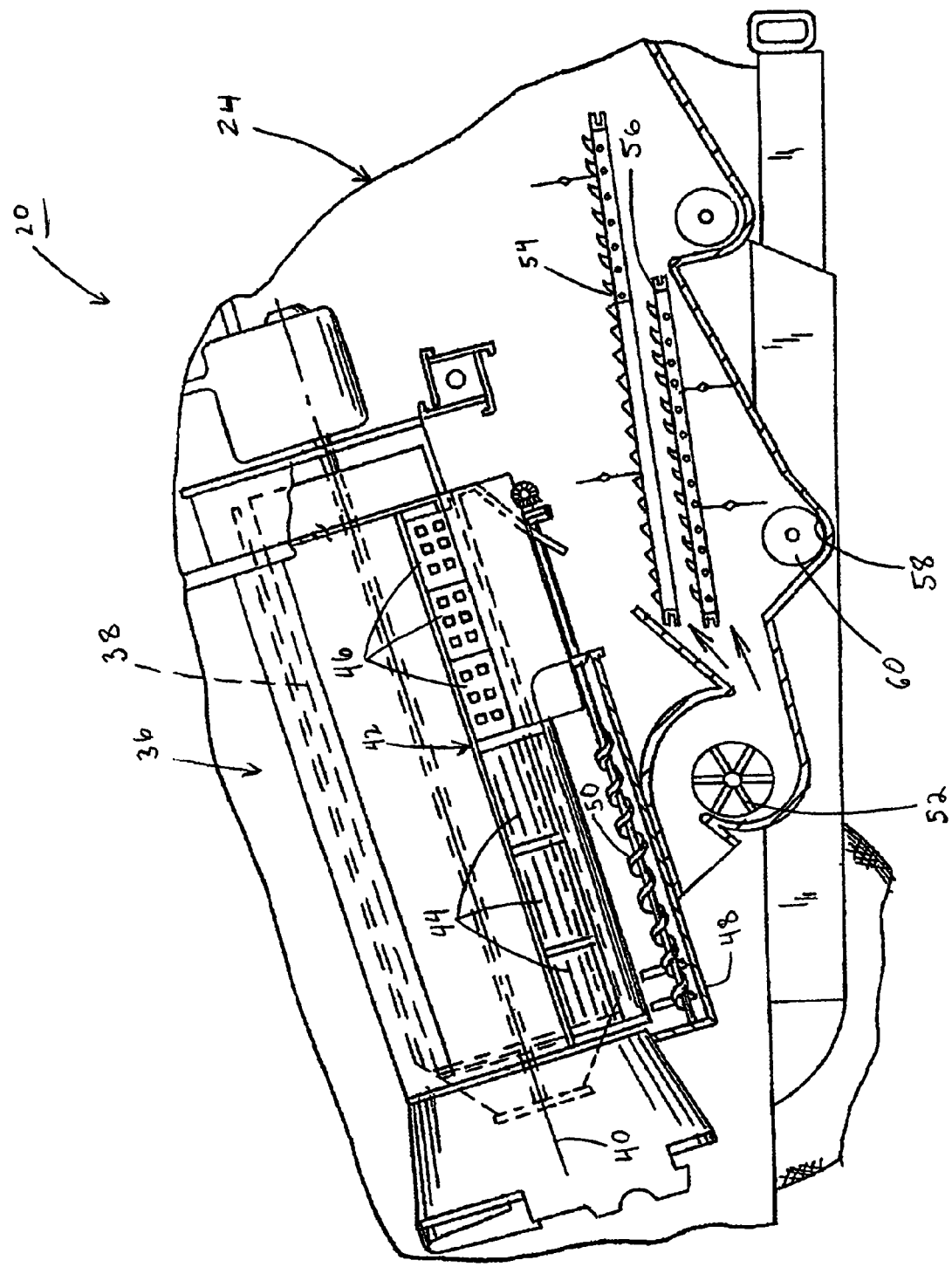
FIG. 2 is a partial side view of a separating apparatus of the combine shown in FIG. 1.

As best shown in FIG. 2, the rotor assembly 36 is preferably configured as a single axial unit that threshes and separates crop materials presented thereto into grain and other materials. However, it should be understood that the rotary combine 20 could be configured with more than one rotary assembly 36, for example, with two units arranged in a parallel configuration. The rotor assembly 36 is mounted in the internal area 24 defined by the body 22 (FIG. 1).

The rotor assembly 36 includes a rotor 38 with a longitudinal extent rotatably mounted to the body 22 about a longitudinal axis of rotation 40, which extends axially along the length of the combine 20. It should be understood that the term longitudinal means of or relating to length or the lengthwise dimension. It should also be understood that the rotor 38, with its longitudinal extent, could be mounted within the body 22 so as to extend laterally from side-to-side within the combine 20.

It should be understood that the terms "left side," "right side," "right," "front," "rear," "upper," "lower," "top," and "bottom," and their derivatives, as used herein, are intended to indicate directions relative to the views presented in the Figures, and in particular, from a perspective when viewing the rotary combine of FIG. 1, and the internal components thereof, from the crop harvesting apparatus 32 toward the steerable rear wheels 28.

Referring back to FIG. 2, between the upstream, or front end, and the downstream, or rear end, of the rotor assembly 36, the crop material is threshed as it spirals around the rotor 38 against a concave 42 disposed partially, circumferentially around the rotor 38. The rotor 38 can be dimensioned with a broad range of diameters, depending on the desired size and performance characteristics of the combine 20.

For example, suitable rotors 38 may have a diameter in the range of fifteen inches to thirty inches, although it should be understood that other diameters, larger and smaller, would also work for the purposes of this invention. The rotor 38 is configured with suitable instrumentalities (not shown) mounted on the peripheral surface thereof that cooperate with the concave 42 to thresh the crops introduced therebetween.

As shown in FIG. 2, the concave 42 can include various semi-cylindrical concave inserts 44 and grate inserts 46, which are generally provided in a lower arcuate fashion and supported by a concave frame (not shown). The rotor 38 is preferably made of steel, and is generally rotated at speeds of between 150 to 1500 revolutions per minute, depending on the type of crop being threshed, and the conditions under which the threshing is being performed. It should be understood, however, that the speed of the rotor 38 is not critical to the operation of the invention, and that other speeds, faster and slower, may be desired and suitable for the purposes of the present invention without detracting or departing from the scope thereof.

Still referring to FIG. 2, the concave inserts 44 and grate inserts 46 each have a plurality of apertures that allow the grain to be separated from the other crop materials as the grain passes through the apertures. Most of the grain drops onto a grain pan 48. The grain is thereafter conveyed rearward from the grain pan 48 by an auger mechanism 50 for subsequent cleaning and collection. Straw, tailings and other waste crop material are impelled rearwardly out of the discharge end of the rotor assembly 36 where a rotary beater throws the straw and other waste material rearwardly from the combine.

The combine 20 further includes a cleaning system for cleaning chaff, straw, tailings and other foreign material from the grain. For example, the cleaning system can include a cleaning fan 52, a chaffer sieve 54, a grain sieve 56, and a clean grain collector 58. A suitable auger mechanism 60 directs clean grain from the clean grain collector 58 into a hopper or grain bin (not shown). It should be understood that other cleaning systems would be suitable for the purposes of the present invention without detracting or departing from the scope thereof.

Referring now to FIGS. 3 and 6–9, a concave 62, including a first preferred concave adjustment mechanism 64, is shown. Referring next to FIGS. 4 and 10–13, illustrated is a concave 66, including a second preferred concave adjustment mechanism 68. Finally, in reference to FIG. 5, a concave 70, including a third preferred concave adjustment mechanism 72 is shown.

It should be understood that each of the concave 62, the concave 66, and the concave 70 are structurally identical with the exception of certain structural aspects of the first preferred adjustment mechanism 64, the second preferred concave adjustment mechanism 68, and the third preferred adjustment mechanism 72. Accordingly, the structure of the concaves 62, 66, and 70 will be discussed together and will include identical numbering for identical structural parts. However, any discussion regarding unique structural and operational aspects of the concave adjustment mechanisms 64, 68, and 72 will be discussed separately and include distinct numbering.

Figure 3:
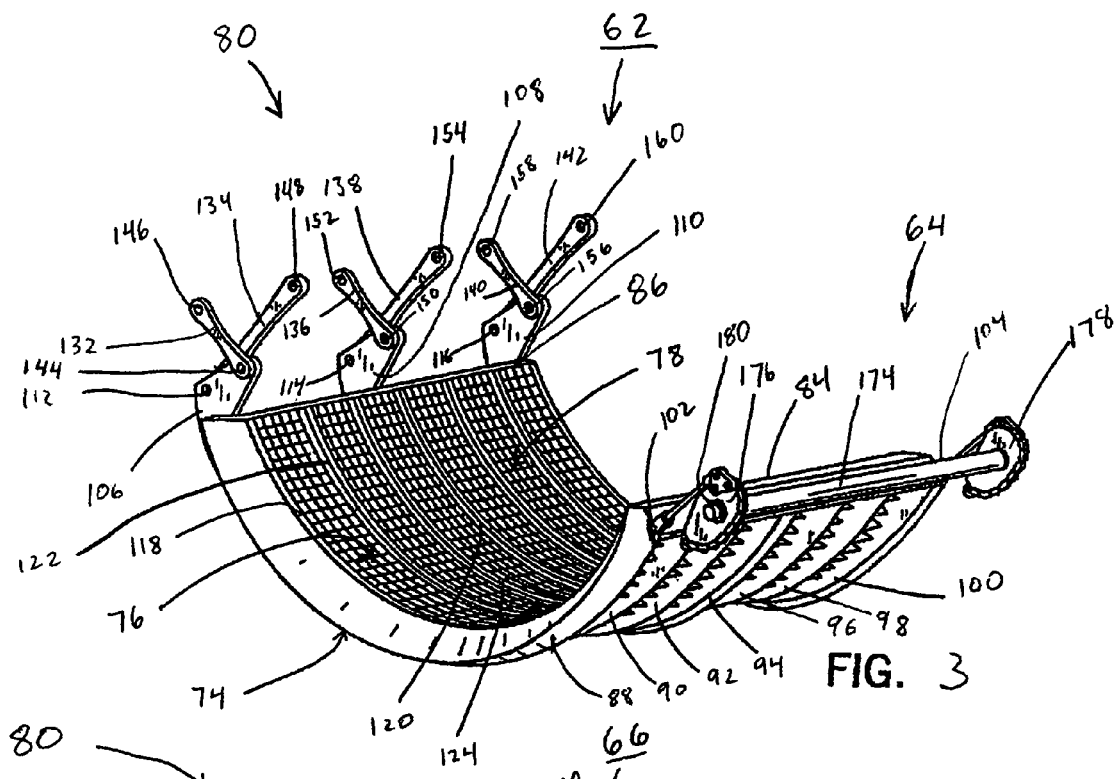
FIG. 3 is a front, right side perspective view showing a first preferred embodiment of a concave adjustment mechanism of the separating apparatus shown in FIG. 2.
Figure 4:
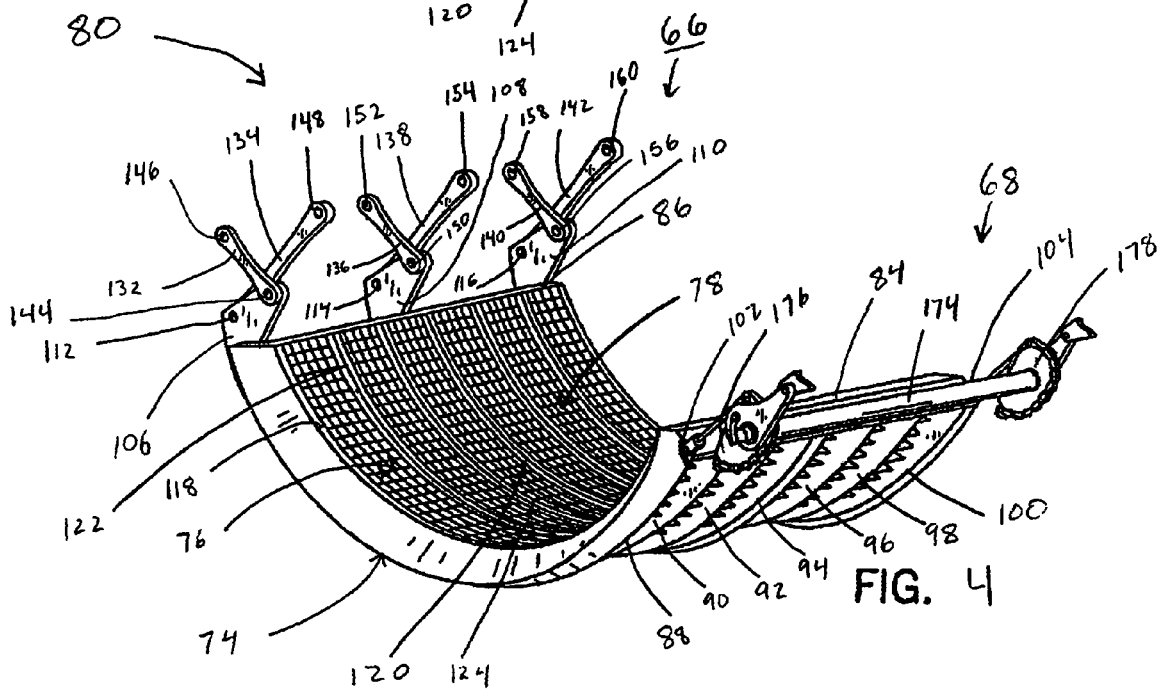
FIG. 4 is a front, right side perspective view showing a second preferred embodiment of a concave adjustment mechanism of the separating apparatus shown in FIG. 2.
Figure 5:
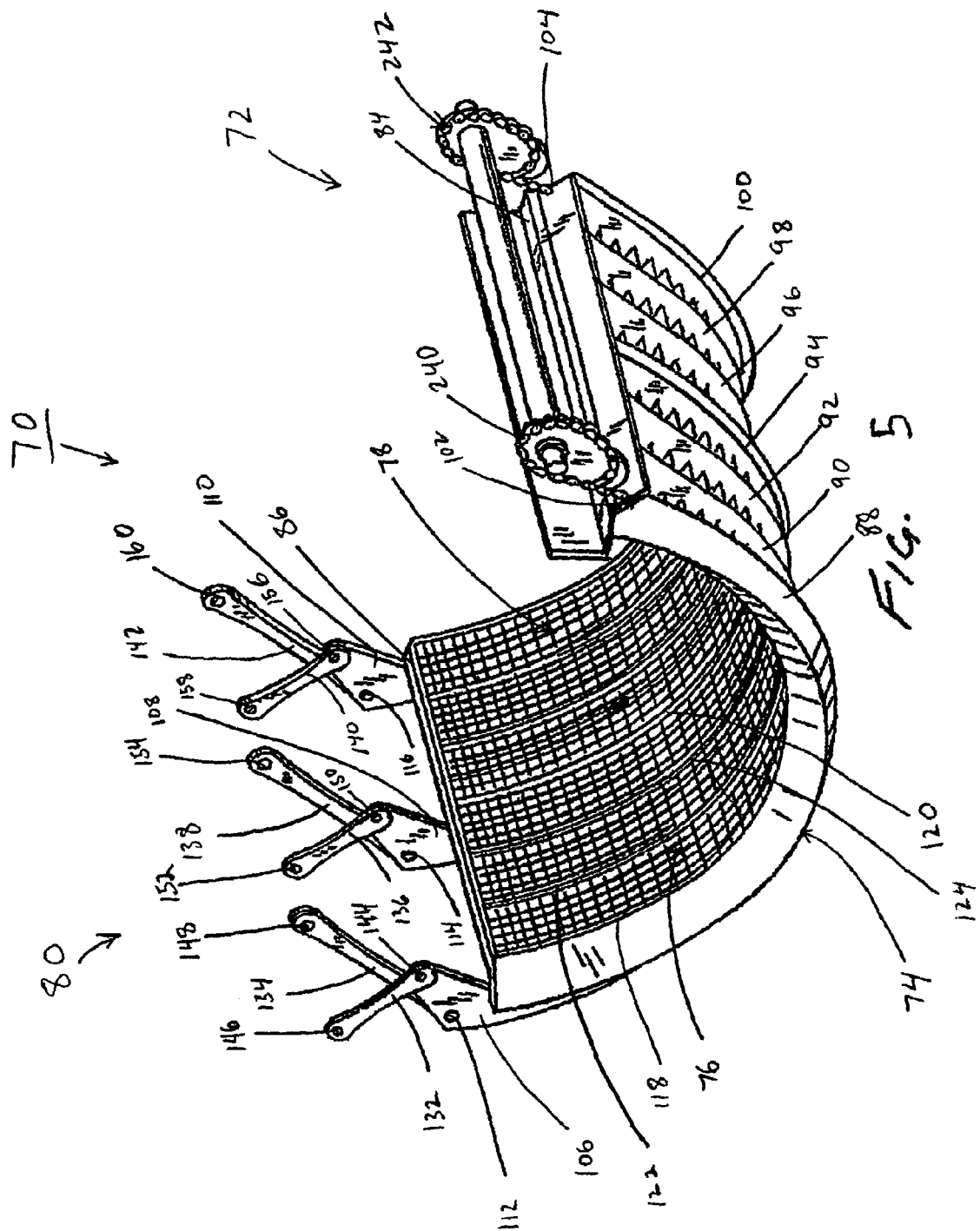
FIG. 5 is a front, right side perspective view showing a third preferred embodiment of a concave adjustment mechanism of the separating apparatus shown in FIG. 2.

Referring now to FIGS. 3–5, it can be seen that the concaves 62, 66, and 70 each include a concave frame 74, which supports a plurality of concave inserts, such as a concave insert 76 and a concave insert 78. The concaves 62, 66, and 70 further include a concave pivot assembly 80.

Turning first to the concave frame 74 shown in FIGS. 3–13, it can be seen that the concave frame 74 extends longitudinally along the lower hemisphere of the rotor 38. A rotor shield 82 extends longitudinally along the upper hemisphere of the rotor 38. The concave frame 74 is generally spaced circumferentially around the rotor 38. Included as part of the concave frame 74 is a longitudinally extending right frame rail 84 and a longitudinally extending left frame rail 86.

The right frame rail 84 and the left frame rail 86 are preferably spaced between about 160 degrees to about 190 degrees relative to each other, and more preferably at about 180 degrees. However, it should be understood that the right frame rail 84 and the left frame rail 86 can be spaced at lesser angles, such as 120 degrees or less.

As illustrated in FIGS. 3–5, the concave frame 74 also includes a plurality of rib members, such as a primary rib member 88, a secondary rib member 90, a secondary rib member 92, a primary rib member 94, a secondary rib member 96, a secondary rib member 98, and a primary rib member 100. The plurality of rib members 88, 90, 92, 94, 96, 98, and 100 extend transversely between the right frame rail 84 and the left frame rail 86 of the concave frame 74.

It is preferred that the plurality of rib members 88, 90, 92, 94, 96, 98, and 100 be longitudinally spaced from one another so that a series of openings are formed between each successive rib member. It should be understood that more or less rib members could be used to define more or less openings. Regardless, it is preferred that each one of the plurality of rib members 88, 90, 92, 94, 96, 98, and 100 is generally arcuate in shape and has an upper arcuate edge (not shown) and a radius substantially the same as, or slightly greater than, the radius of the rotor 38.

Figure 7:
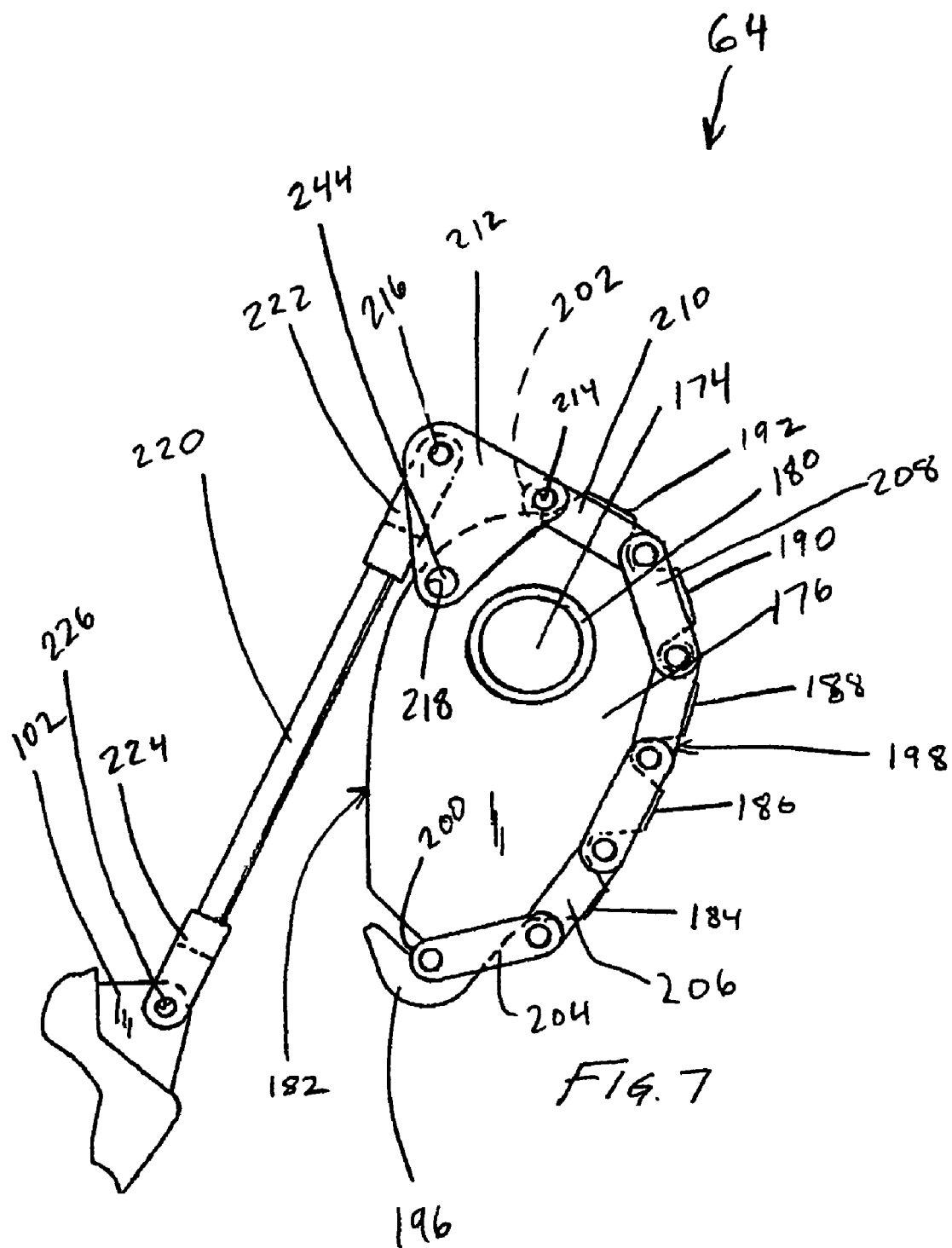
FIG. 7 is an enlarged, partial front end longitudinal view of the concave adjustment mechanism shown in FIG. 6.
Figure 11:
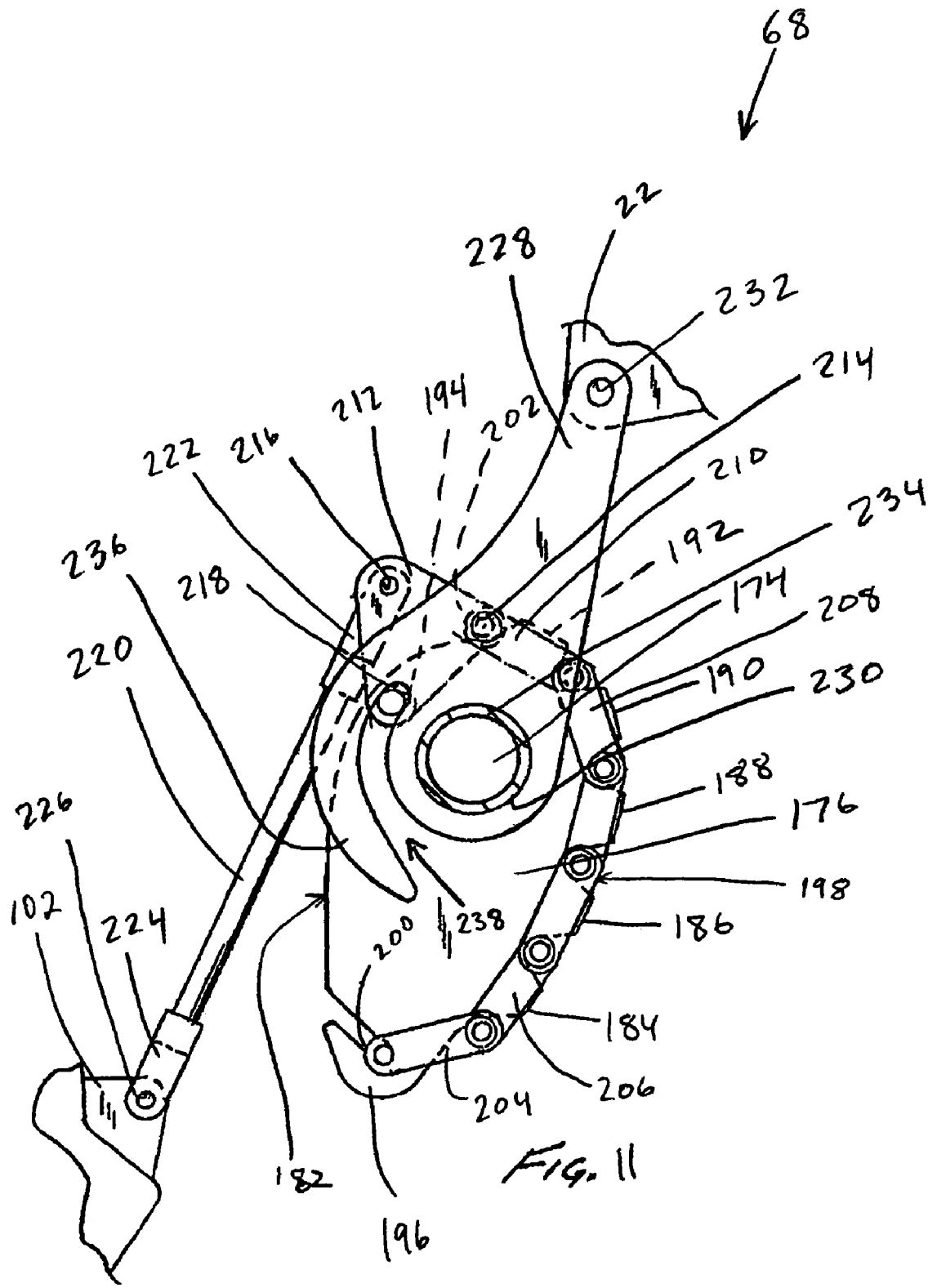
FIG. 11 is an enlarged, partial front end longitudinal view of the concave adjustment mechanism shown in FIG. 10.
Figure 13:
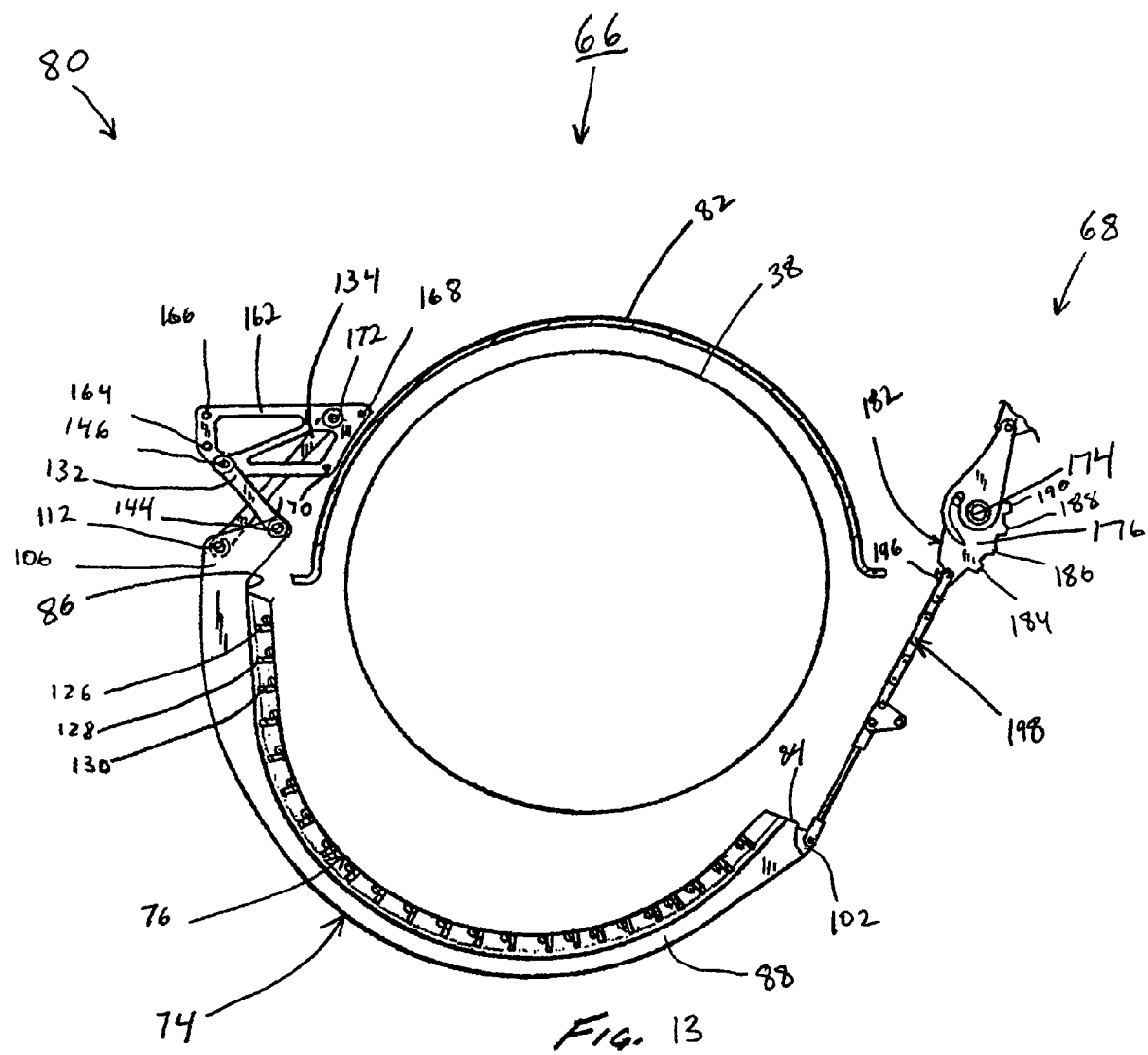
FIG. 13 is an enlarged front end longitudinal view, in the "fully opened position" (i.e. extended range), of the concave adjustment mechanism shown in FIG. 4.

As shown generally in FIGS. 3–5 and more specifically in FIGS. 7 and 11, the primary rib members 88 and 100 define lugs, such as a rib lug 102 and a rib lug 104, adjacent to the right frame rail 84 of the concave frame 74. Each of the rib lugs 102 and 104 define an aperture (not shown), which is adapted to pivotally couple to a rigid linkage, which will be discussed later.

As further shown in FIGS. 3–5, the primary rib members 88, 94, and 100 define additional lugs, such as a shoulder lug 106, a shoulder lug 108, and a shoulder lug 110, adjacent to the left frame rail 86. The shoulder lugs 106, 108, and 110 each include a set of apertures, such as a lower aperture 112 and an upper aperture (not shown); a lower aperture 114 and an upper aperture (not shown); and a lower aperture 116 and an upper aperture (not shown).

It can further be seen in FIGS. 3–5 that each of the concaves 62, 66, and 70 further include identical concave inserts 76 and 78. Because both the concaves 76 and 78 are preferably structurally identical, it will be appreciated that only a detailed description needs to be made in reference to the concave insert 76.

In general, the concave inserts 76 and 78 are releasably mounted to the concave frame 74 in a side-by-side configuration. As shown in FIGS. 3–5, each of the concave inserts 76 and 78 are generally arcuate in shape and have a circumferential span of approximately 90 degrees.

As illustrated by the concave insert 76 of FIGS. 3–5, it can be seen that the concave insert 76 includes two opposite transversely extending side frame members, such as side frame member 118 and side frame member 120. As further illustrated by the concave insert 76, an intermediate frame member 122 and an intermediate frame member 124 extends transversely along the circumferential span of the concave insert 76.

Turning now to FIGS. 6, 8–10 and 12–13, it can further be seen that the concave insert 76 includes a plurality of longitudinal frame members, such as a longitudinal frame member 126, a longitudinal frame member 128, a longitudinal frame member 130, etc. Each of the longitudinal frame members 126, 128, 130, etc. extends longitudinally between the side frame members 118 and 120 (not shown) of the concave insert 76. Thus, in cooperation with the concave frame 74, the concave insert 76 forms a plurality of apertures through which grain product passes for collection by the grain pan 48 (not shown).

Turning back to FIGS. 3–5, it can be seen that each of the concaves 62, 66, and 70 additionally includes a pivot assembly 80. One example of a preferred pivot assembly 80 is disclosed is disclosed in a copending U.S. patent application, 10/755,806, titled "Mechanism and Method for Transversely Pivoting the Pinch-Point of a Concave", filed on Jan. 12, 2004 on behalf of CNH America LLC, the same assignee as in the present application, and which is hereby incorporated herein by reference.

The pivot assembly 80 has three sets of linking members, such as a linking member 132 and a linking member 134; a linking member 136 and a linking member 138; and a linking member 140 and a linking member 142. The three sets of linking members 132 and 134; 136 and 138; and 140 and 142 are preferably made of a rigid material, such as steel, and are generally formed in the shape of a "dog bone."

It is further preferred that the linking members 134, 138, and 142 be slightly longer than their counterpart linking members 132, 136, and 140 for mounting purposes. However, the size and shape of the linking members 132 and 134; 136 and 138; and 140 and 142 are generally unimportant and may be altered as desired. The linking members 132 and 134; 136 and 138; and 140 and 142 could also be constructed of any suitable rigid material and be of any size or shape.

In reference to FIGS. 3–5, it is contemplated that each of the linking members 132 and 134; 136 and 138; and 140 and 142 include a lower aperture and an upper aperture. For example, the linking member 132 includes a lower aperture 144 and an upper aperture 146 and the linking member 134 includes a lower aperture (not shown) and an upper aperture 148; the linking member 136 includes a lower aperture 150 and an upper aperture 152 and the linking member 138 includes a lower aperture (not shown) and an upper aperture 154; and the linking member 140 includes a lower aperture 156 and an upper aperture 158 and the linking member 142 includes a lower aperture (not shown) and an upper aperture 160.

Assembly of the pivot point 80 occurs as follows: the lower aperture 144 of the linking member 132 pivotally couples with the upper aperture (not shown) of the shoulder lug 106 and the lower aperture (not shown) of linking member 134 pivotally couples with the lower aperture 112 of the shoulder lug 106; the lower aperture 150 of the linking member 136 pivotally couples with the upper aperture (not shown) of the shoulder lug 108 and the lower aperture (not shown) of the linking member 138 pivotally couples with the lower aperture 114 of the shoulder lug 108; and the lower aperture 156 of the linking member 140 pivotally couples with the lower aperture (not shown) of the shoulder lug 110 and the lower aperture (not shown) of the linking member 142 pivotally couples with the lower aperture 116 of the shoulder lug 110.

Pivot axis points are defined at each coupling through the use of suitable fasteners, such as pivot pins (not shown). While use of pivot pins are preferred, other suitable fastening devices, such as rivets or bolts, could also be used.

Turning now to FIGS. 6, 8–10 and 12–13, it can be seen that each of the concaves 62, 66, and 70 include mounting brackets that correspond with each of the sets of linking members 132 and 134; 136 and 138; and 140 and 142. However, because of the longitudinal views of FIGS. 6, 8–10, and 12–13, only a mounting bracket 162 is illustrated. Because each mounting bracket is structurally identical, only a detailed description in reference to the mounting bracket 162 is necessary.

Accordingly, as illustrated, the mounting bracket 162 is preferably constructed of a rigid material, such as steel, and is secured to the body 22 (not shown) of the combine 20 (not shown) through use of any suitable fastener (not shown), such as bolts, welds, or rivets. As further illustrated by FIGS. 6, 8–10, and 12–13, the mounting bracket 162 further includes a plurality of linking member mounting apertures, such as a lower mounting aperture (not shown), a mounting aperture 164, a mounting aperture 166, a mounting aperture 168, a mounting aperture 170, and an upper mounting aperture 172.

Accordingly, the lower mounting aperture (not shown), the upper mounting aperture 172 and the remaining mounting apertures 164, 166, 168, and 170 allow for the accommodation of different dimensions of rotors 38 and linking members 132 and 134. Accordingly, it is contemplated that the mounting bracket 162 could include more or fewer mounting apertures as needed. However, it is preferred that the upper aperture 146 of the linking member 132 is adapted to pivotally couple, through use of a fastener, such as a pivot pin (not shown), to the lower aperture (not shown) of the mounting bracket 162.

Similarly, the upper aperture 148 (see FIGS. 3–5) of the linking member 134 pivotally couples, through use of a fastener, such as a pivot pin (not shown), to the upper aperture 172 of the mounting bracket 162. While use of pivot pins are preferred for coupling the linking members 132 and 134 to the mounting bracket 162, other suitable fastening devices, such as rivets or bolts, could also be used.

When properly mounted, the linking members 132 and 134 will form an "X" relative to one another. Such a mounting at the pivot assembly 80 will fix a consistent side-to-side pivot axis, which will provide improved clearance spacing between the concave frame 74 and the rotor 38 of the combine 20 (not shown).

Turning now to the first preferred concave adjustment mechanism 64, as shown in FIGS. 3 and 6–9, it can be seen that a rotatable shaft 174 extends longitudinally along, and is located adjacent to, the right frame rail 84 of the concave frame 74. An actuation motor (not shown) is coupled to the rotatable shaft 174 to provide rotational force.

Mounted upon the rotatable shaft 174 at each end is a rotatable member, such as a cam sprocket 176 and a cam sprocket 178. While it is preferred that each of the rotatable members is a cam sprocket 176 and 178, it should also be understood that other rotatable members and embodiments, such as circular or non-circular sprockets, wheels, etc. could also be used.

In reference to FIGS. 6–9, it should be noted that because of the longitudinal view, only the forward most cam sprocket 176 is illustrated. However, both the cam sprockets 176 and 178 are structurally identical and include structurally identical related components. Accordingly, it will be appreciated that only a detailed description needs to be made in reference to the cam sprocket 176 and its associated components.

Figure 8:
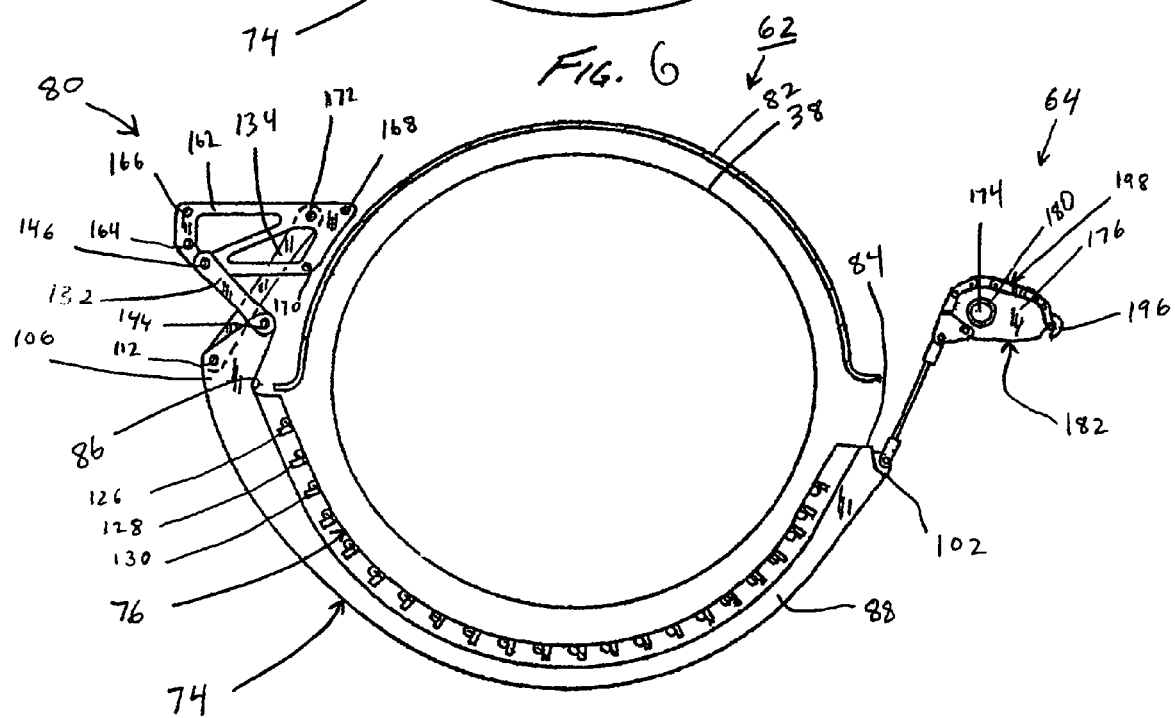
FIG. 8 is an enlarged front end longitudinal view, in the "clean-out position," of the concave adjustment mechanism shown in FIG. 3.
Figure 9:
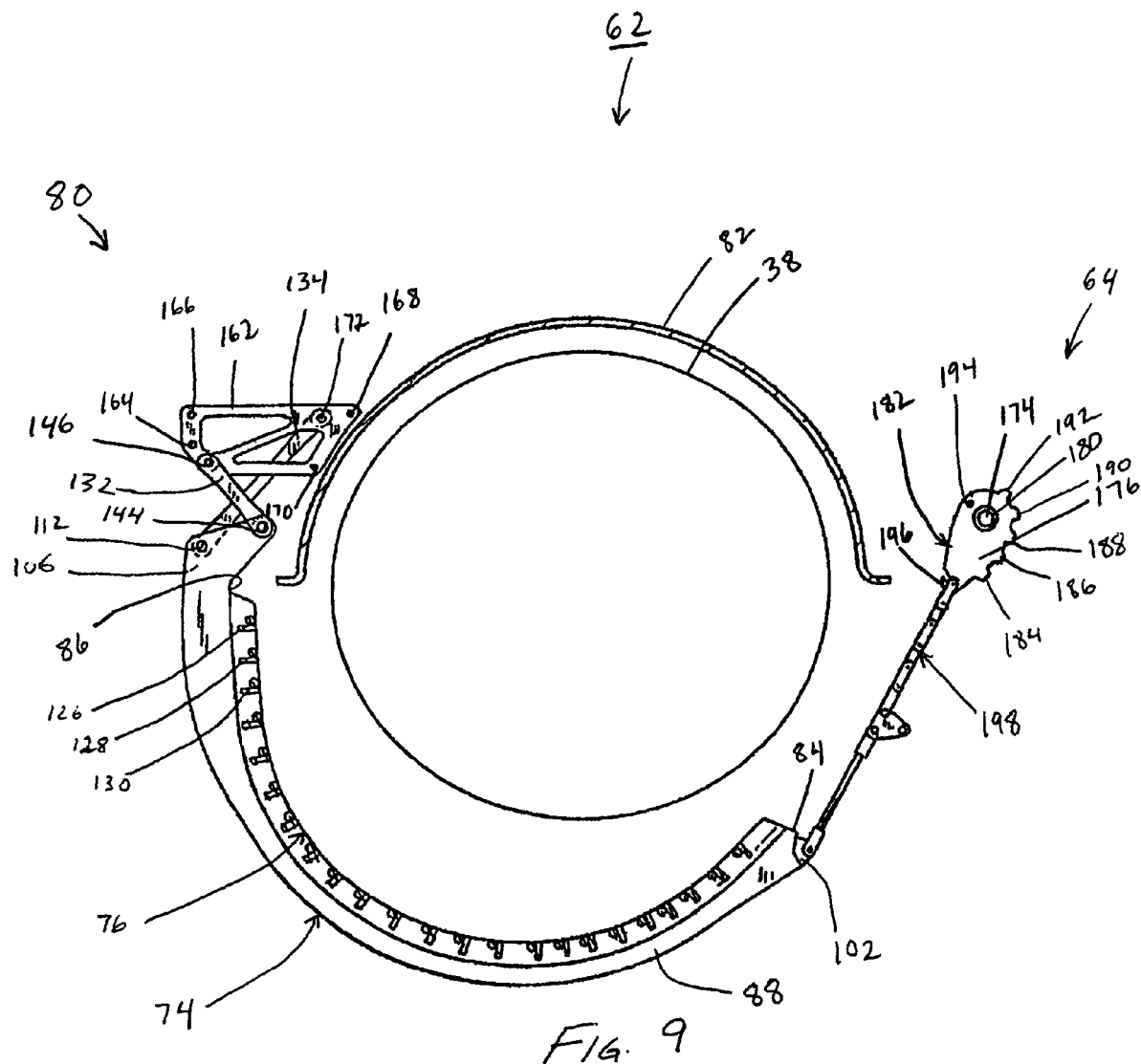
FIG. 9 is an enlarged front end longitudinal view, in the "fully opened position" (i.e. extended range), of the concave adjustment mechanism shown in FIG. 3.
Figure 10:
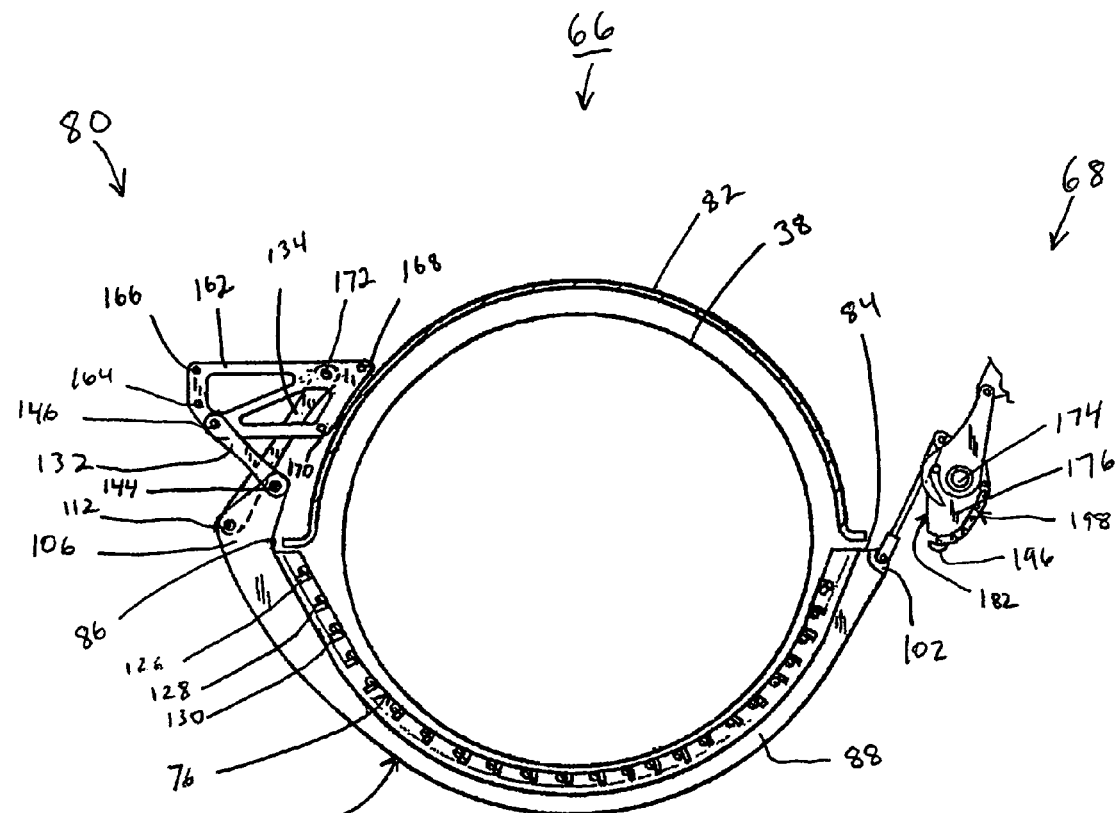
FIG. 10 is an enlarged front end longitudinal view, in the "fully closed position," of the concave adjustment mechanism shown in FIG. 4.

Focusing now on FIGS. 6–9, it can be seen that the cam sprocket 176 is securely mounted to the rotatable shaft 174, for rotation therewith. It is preferred that a suitable fastener 180, such as a nut, lock washer, etc., be used. As best illustrated by FIGS. 7 and 9, the cam sprocket 176 defines a peripheral surface 182.

It is preferred that at least approximately one-half of the peripheral surface 182 of the cam sprocket 176 include a contiguous plurality of tines, such as a tine 184, a tine 186, a tine 188, a tine 190, and a tine 192. However, more or less of the peripheral surface 182 of the cam sprocket 175 can be utilized if desired. Additionally, while tines 184, 186, 188, 190, and 192 are preferred, it is contemplated that more or less tines could be included or deleted, as also desired.

As best shown by FIG. 9, the cam sprocket 176 further includes a locking aperture 194 configured axially therethrough and preferably located adjacent to the tine 192. The Locking aperture 194 is adapted to receive a suitable removable locking pin (not shown), as will be later discussed. The cam sprocket 176 further includes an outwardly extending finger member, such as a hook 196.

The hook 196 extends radially outward from the peripheral surface 182 and with respect to the axis of rotation of the cam sprocket 176. The hook 196 is configured to pivotally couple to an end of a flexible member or linkage, such as a chain 198. While the chain 198 is preferred, other flexible members or linkages, such as wires, cables, ropes, or straps, could also be used.

As further detailed in FIG. 7, the chain 198 includes a first end 200 and a second end 202. The chain 198 further preferably includes, starting at the first end 200, a plurality of chain links, such as a chain link 204, a chain link 206 . . . a chain link 208, and, terminating at the second end 202, a chain link 210.

Accordingly, the chain 198 is preferably pivotally engaged with the hook 196 of the cam sprocket 176. For example, it is contemplated that the chain link 204 can be slid over the hook 196 of the cam sprocket 176. While such a manner of pivotal coupling is preferred, it is contemplated that pivotal coupling could occur through any other suitable manner, such as by use of a pivot pin, rivet, bolt, weld, etc.

As also detailed in FIG. 7, a connection link 212 is pivotally coupled to the second end 202 of the chain 198. It is preferred that the connection link 212 be generally triangular in shape and include three apertures, such as an aperture 214, an aperture 216, and a locking aperture 218. Each of the apertures 214 and 216 and the locking aperture 218 is preferably positioned adjacent to an outward point of the triangle.

The locking aperture 218 is adapted to receive a suitable removable locking pin (not shown) for securely locking to the cam sprocket 176, as will be later discussed. The aperture 214 of the connection link 212 is configured to pivotally couple with the chain link 210. It is preferred that such pivotal coupling will occur through use of a fastener, such as a pivot pin (not shown). However, other suitable fastening devices, such as rivets, bolts, etc., could also be used.

Focusing further on FIG. 7, it can be seen that the aperture 216 of the connection link 212 is configured to pivotally couple to a rigid linkage 220. The rigid linkage 220 includes an upper coupling sleeve 222 and a lower coupling sleeve 224. The upper coupling sleeve 222 includes an aperture (not shown) and is adapted to pivotally couple with the aperture 216 of the connection link 212 through use of a fastener, such as a pivot pin (not shown). While use of a pivot pin is preferred, other suitable fastening devices such as rivets, bolts, etc., could also be used.

Similarly, the lower coupling sleeve 224 also includes an aperture 226 and is configured to pivotally couple with the aperture (not shown) of the rib lug 102 through use of a fastener, such as a pivot pin (not shown). Again, while use of a pivot pin is preferred, other suitable fastening devices such as rivets or bolts could also be used.

Turning now to FIGS. 4 and 10–13, the second preferred concave adjustment mechanism 68 is shown. As previously noted in reference FIGS. 6–9, it will be appreciated that only the forward most cam sprocket 176 is illustrated due to the longitudinal view of the Figures. However, because both the cam sprockets 176 and 178 are structurally identical and include structurally identical associated components, it will be appreciated that only a detailed description needs to be made in reference to the cam sprocket 176 and its associated components. It should also be noted that because the second preferred concave adjustment mechanism 68 is generally structurally identical to the first preferred mechanical adjustment mechanism 64, identical numbering will be used where appropriate.

Focusing now on FIGS. 4 and 10–13, it can be seen that the second preferred concave adjustment mechanism 68 includes a capturing device 228. As detailed in FIG. 11, the capturing device 228 is generally pear-shaped and includes a lower mounting aperture 230 configured into its lower portion. An upper mounting aperture 232 is configured into the upper portion of the capturing device 228.

It is preferred that the lower mounting aperture 230 have a diameter at least slightly larger than that defined by the rotatable shaft 174 so that the lower mounting aperture 230 can fit over and about the rotatable shaft 174 without rotating therewith. The lower mounting aperture 230 is secured about the rotatable shaft 174 with a suitable fastener 234, such as a nut, lock washer, etc.

The upper mounting aperture 232 of the capturing device 228 is adapted to accommodate a secure fastener (not shown), such as a bolt, weld, rivet, or adhesive, to ensure that the upper portion of the capturing device 228 is securely affixed to the body 22 of the combine 20 (not shown).

The capturing device 228 further includes a downwardly extending finger 236. The downwardly extending finger 236 extends from a center portion of the capturing device 228 and partially around the lower portion of the capturing device 228. A slot area 238, which acts as a travel limit, is defined between the downwardly extending finger 236 and the body of the capturing device 228.

As will be further discussed in more detail in reference to the operation of the second preferred concave adjustment mechanism 68, the capturing device 228 and associated slot area 238 are configured to securely receive a suitable removable locking pin (not shown). Accordingly, the capturing device 228 and slot area 238 act to control and limit the upward travel of the concave frame 74 relative to the rotor 38.

While the preceding first preferred concave adjustment mechanism 64 and second preferred adjustment mechanism 68 are most desired, a third preferred concave adjustment mechanism 70 is also contemplated. For example, in reference to FIG. 5, it is envisioned that only flexible linkages, such as a chain 240 and a chain 242, could be used to effect movement and clearance spacing of the concave 70 relative to the rotor (not shown) of a combine (not shown).

Operation of the first preferred concave adjustment mechanism 64 will now be discussed in reference to FIGS. 6–9. First, in particular reference to FIGS. 6–7, it can be seen that the concave 62 is in a "fully closed position." The "fully closed position" is preferable for the threshing of smaller sized crop grain, such as wheat. It can also be seen that the concave frame 74 has been drawn near the rotor 38 of the combine 20.

Figure 6:
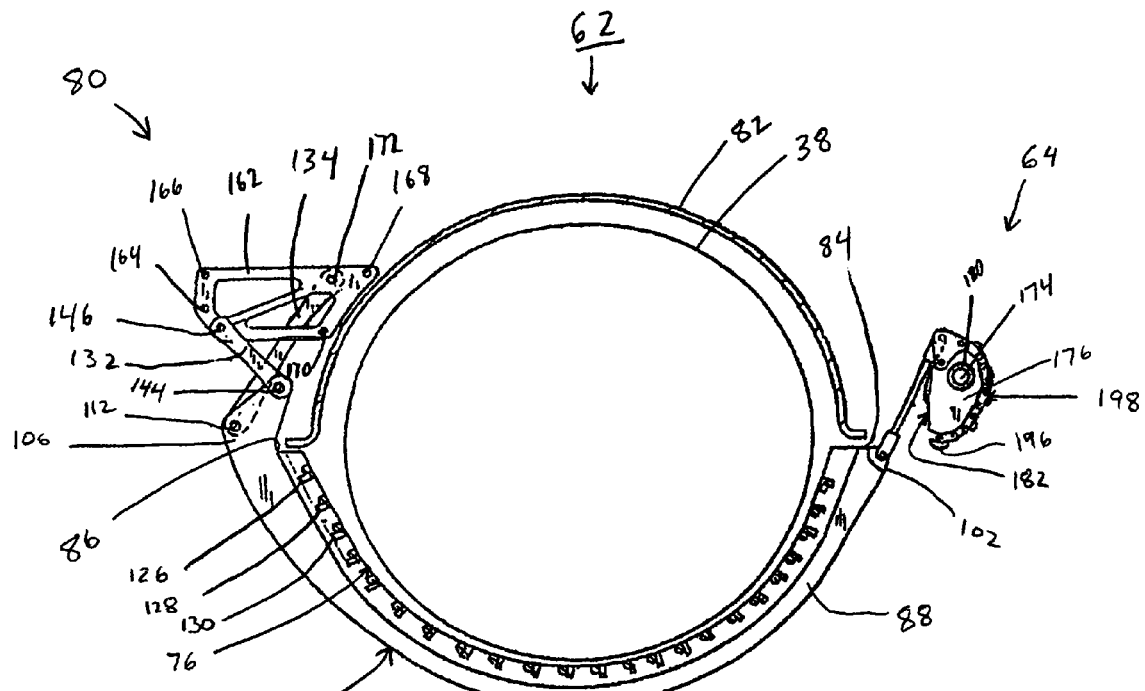
FIG. 6 is an enlarged front end longitudinal view, in the "fully closed position," of the concave adjustment mechanism shown in FIG. 3.

Focusing closely upon the concave adjustment mechanism 64 of FIGS. 6–7, it can be seen that the link 204 of the chain 198 is pivotally engaged with the hook 196 of the cam sprocket 176. The actuation motor (not shown) has actively rotated the rotational shaft 174 and the cam sprocket 176 upward. In this position, the actuation motor (not shown) holds the rotatable shaft 174 and cam sprocket 176 in place so that the hook 196 of the cam sprocket is positioned in a downward direction. Consequently, the chain 198, including the chain links 204, 206 . . . 208, and 210 have engaged with, and have been received by, the plurality of tines 184, 186, 188, 190, and 192 of the cam sprocket 176.

It can further be seen that the connection link 212 is being held securely in place against the cam sprocket 176. Specifically, the locking aperture 218 of the connection link 212 has been positioned over the locking aperture 194 (see FIG. 9) of the cam sprocket 176 and a removable locking pin 244 (see FIG. 7) has been inserted therethrough. While use of the locking pin 244 is preferred, other suitable fastening devices such as rivets, bolts, etc. could also be used.

In this position, the upper coupling sleeve 222 of the rigid linkage 220 has been coupled to the aperture 216 of the connection link 212 through use of a fastener, such as a pivot pin (not shown). Similarly, the lower coupling sleeve 224 has been coupled to the rib lug 102 through use of a fastener, such as a pivot pin (not shown). Such a rigid coupling in the "fully closed position" (FIGS. 6–7) prevents the concave 62 from "jumping" upward toward the rotor 38.

Turning now to FIG. 8, it can be seen that the concave frame 74 has been lowered from the "fully closed position" of FIGS. 6–7 to the "clean-out position." The "clean-out position" is preferable for removing excess crop material. In operation, a user will preferably actuate the actuation motor (not shown) so that the cam sprocket 176 rotates downward into the "clean-out position." Alternatively, downward rotation of the cam sprocket 176 could occur through gravitational force.

As the cam sprocket 176 and rotational shaft 174 rotate in a downward direction, the connection link 212 and corresponding rigid linkage 220 are also actuated downward, thereby creating an improved clearance spacing between the concave frame 74 and the rotor 38.

Turning finally to FIG. 9, it can be seen that the concave frame 74 has been further lowered from the "clean-out position" to the "fully opened position" (i.e. extended range). The "fully opened position" generally creates a clearance spacing of approximately four to eight inches between the rotor 38 and the concave frame 74; however, it should be appreciated that the clearance spacing could be greater or less. Regardless, such a clearance spacing is sufficient for the easy removal of material that is lodged between the concave frame 74 and the rotor 38. Movement is effected from the "clean-out position" to the "fully opened position" upon removal of the locking pin 244 from the locking aperture 194 of the cam sprocket 176 and the locking aperture 218 of the connection link 212.

As shown in FIG. 9, removal of the locking pin 244 will free the connection link 212 from its secure attachment to the cam sprocket 176. Accordingly, the cam sprocket 176, through actuation of the actuation motor (not shown) or downward gravitational force, will be free to rotate downward, thereby disengaging the chain links 204, 206 . . . 208, and 210, of the chain 198 from the plurality of tines 184, 186, 188, 190, and 192. Consequently, a significant clearance spacing between the concave frame 74 and the rotor 38 is achieved.

Turning now to FIGS. 10–13, operation of the second preferred concave adjustment mechanism 68 is shown. Focusing particularly on FIGS. 10–11, it can be seen that the capturing device 228 is securely affixed to the body 22 of the combine 20 (not shown). The capturing device is also non-rotatably mounted and secured about the rotatable shaft 174 through use of the fastener 234. The slot area 238 defined by the downwardly extending finger 236 has received the locking pin 244 and is acting as a travel limit to prevent further upward rotation of the cam sprocket 176. In turn, the concave 66 is prevented from being raised into, and damaged by, the rotor 38.

Figure 12:
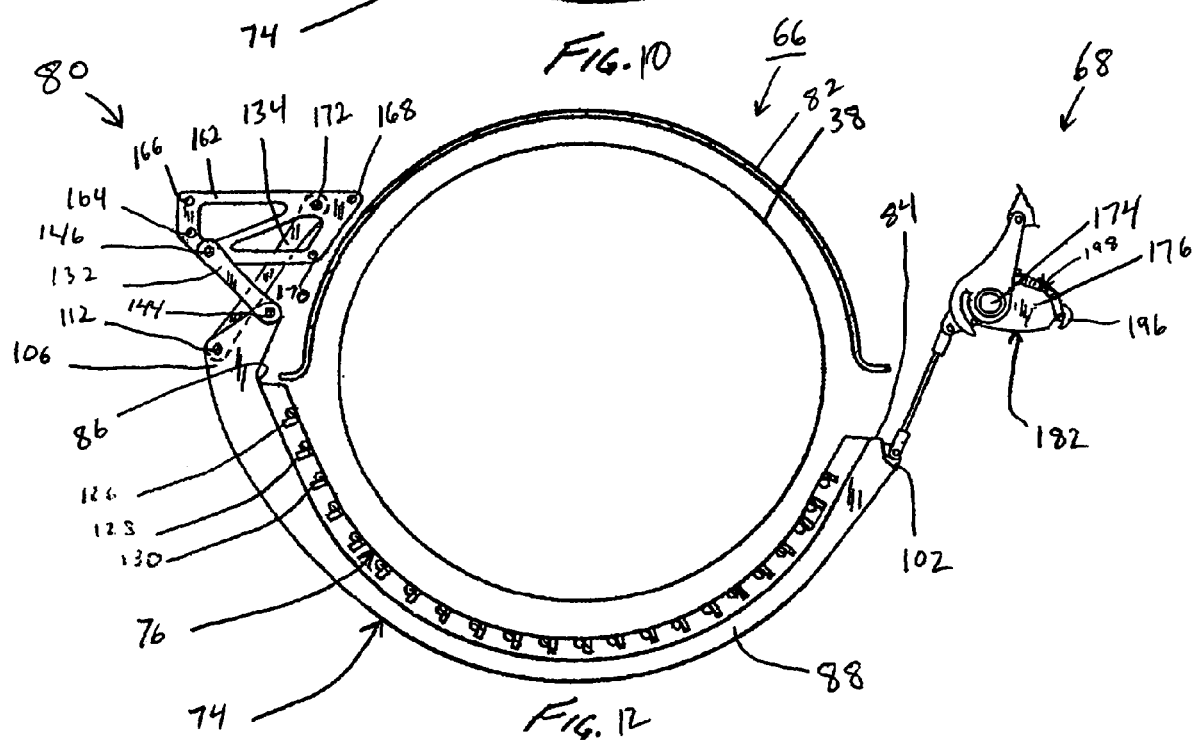
FIG. 12 is an enlarged front end longitudinal view, in the "clean-out position," of the concave adjustment mechanism shown in FIG. 4.

Turning now to FIG. 12, it can be seen that as the cam sprocket 176 rotates downward from the "fully closed position" to the "clean-out position," the locking pin 244 begins to descend out of the slot area 238 of the capturing device 228. However, the cam sprocket 176 will be prevented from further downward rotation as long as the locking pin 244 remains inserted through the locking aperture 218 of the connection link 212 and the locking aperture 194 (not shown in FIG. 12) of the cam sprocket 176.

Thus, once the locking pin 244 is removed, the cam sprocket 176 will be free to rotate downward, thereby disengaging the chain links 204, 206 . . . 208, and 210, of the chain 200 from the plurality of tines 184, 186, 188, 190, and 192. Accordingly, a significant clearance spacing between the concave frame 74 and the rotor 38 is achieved.

Finally, to raise the concave frame 74 from the "fully opened position" (i.e. extended range) to the "fully closed position," the actuation motor (not shown) must be activated. In both the first preferred concave adjustment mechanism 64 (see FIGS. 6–9) and the second preferred concave adjustment mechanism 68 (see FIGS. 10–13), the actuation motor (not shown) will rotate the rotatable shaft 174, which will begin rotation of the cam sprocket 176. As the cam sprocket 176 rotates upward, the chain 198 and the corresponding chain links 204, 206 . . . 208, and 210 will engage with, and be indexed by, the plurality of tines 184, 186, 188, 190, and 192 of the peripheral surface 182 of the cam sprocket 176.

Once the concave frame 74 has been raised into the "clean-out position," the user will insert the locking pin 244 through the locking aperture 218 of the connection link 212 and into the locking aperture 194 of the cam sprocket 176. Such insertion will allow the connection link 212 to be securely affixed to the cam sprocket 176 and provide a rigid coupling that can be further adjusted upward by the rotatable shaft into the "fully closed position." Such a rigid coupling prevents the concave 62 from "jumping" upward toward the rotor 38.

Finally, in particular reference to the second preferred concave adjustment mechanism 68, it can be seen that when the concave frame 74 raises through the "clean-out position" and into the "fully closed position," the slot area 238 of the capturing device 228 receives the locking pin 244. Here, the slot area 238 of the capturing device 228 provides a travel limit to prevent further rotation of the cam sprocket 176 and subsequent raising of the concave 66 into the rotor 38 of the combine 20

Accordingly, the present invention provides a concave adjustment mechanism and method for effecting movement and clearance spacing of a concave relative to the rotor of a combine through use of an adjustable rigid mechanical linkage.

More specifically, the present invention provides an adjustable rigid concave linkage when the concave is placed in a "fully closed position" and "clean-out position" and a flexible concave linkage when the concave is placed in a "fully opened position" (i.e. extended range).

The adjustment mechanism thus provides an extended actuation range to allow for easy removal of material lodged between the rotor of the combine and the concave. In turn, the extended actuation range decreases rotor actuation motor torque and increases rotor mechanical advantage. Finally, the present invention provides a travel limit to protect the concave from being raised into, and damaged by, the rotor of a combine.

Although an exemplary embodiment of the concave adjustment apparatus and method has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. An adjustment mechanism for effecting movement and clearance spacing of a concave relative to a rotor of a combine, said adjustment mechanism comprising:
   at least one rotatable shaft;
   at least one rotatable sprocket, said rotatable sprocket mounted on said rotatable shaft for rotation therewith;
   at least one linking assembly, said linking assembly including at least one chain, said linking assembly coupling said rotatable sprocket to said concave; and
   at least one capturing device, said capturing device non-rotatably mounted about said rotatable shaft and positioned adjacent to said rotatable sprocket, said capturing device including a travel limit, said second end of said chain including a connection link having a removable locking member, said travel limit configured to securely receive said removable locking member of said connection link and control and limit travel of said concave toward said rotor of said combine upon rotation of said rotatable member from an "opened position" to a "closed position."

2. The adjustment mechanism of claim 1, wherein said rotatable sprocket is a cam.

3. The adjustment mechanism of claim 1, wherein said linking assembly further includes at least one rigid member, said rigid member coupling said chain to said concave.

4. The adjustment mechanism of claim 3, wherein said rigid member includes a first end and a second end, and wherein said chain includes a first end and a second end, said first end of said chain engaged with said rotatable sprocket, said first end of said rigid member engaged with said concave, said second end of said rigid member engaged with said second end of said chain.

5. An adjustment mechanism for effecting movement and clearance spacing of a concave relative to a rotor of a combine, said adjustment mechanism comprising:
   at least one rotatable shaft;
   at least one rotatable cam sprocket, said rotatable cam sprocket mounted on said rotatable shaft for rotation therewith;
   at least one linking assembly coupling said rotatable cam sprocket to said concave, said linking assembly comprising:
      a chain having a first end and a second end, said second end including a connection link, said connection link including a removable locking member, wherein said first end of said chain engages said rotatable cam sprocket; and
      a rigid member having a first end and a second end, wherein said first end of said rigid member engages said concave, and wherein said second end of said rigid member engages said connection link of said second end of said chain; and
   at least one capturing device, said capturing device non-rotatably mounted about said rotatable shaft and positioned adjacent to said rotatable cam sprocket, said capturing device including a travel limit slot configured to securely receive said removable locking member of said connection link and control and limit travel of said concave toward said rotor of said combine upon rotation of said rotatable member from an "opened position" to a "closed position."

6. An adjustment mechanism for effecting movement and clearance spacing of a concave relative to a rotor of a combine, said adjustment mechanism comprising:
   at least one rotatable shaft;
   at least one rotatable member, said rotatable member defining a peripheral surface, said rotatable member mounted on said rotatable shaft for rotation therewith; and
   at least one linking assembly, said linking assembly including at least one flexible member, said linking assembly coupling said rotatable member to said concave, wherein said rotatable member includes a finger extending radially outward with respect to an axis of rotation of said rotatable member, said finger engaging said flexible member, wherein said linking assembly further includes at least one rigid member, said rigid member coupling said flexible member to said concave, wherein said rigid member includes a first end and a second end, and wherein said flexible member includes a first end and a second end, said first end of said flexible member engaged with said rotatable member, said first end of said rigid member engaged with said concave, said second end of said rigid member engaged with said second end of said flexible member, wherein said second end of said flexible member includes a connection link, said rotatable member configured to accommodate at least a portion of said connection link upon said rotatable of said rotatable member from said "opened position" to said "closed position."

7. The adjustment mechanism of claim 6 further comprising an actuation motor coupled to said rotatable shalt, said actuation motor rotating said rotatable shaft.

8. The adjustment mechanism of claim 6, wherein said peripheral surface of said rotatable member is configured to receive at least a portion of said flexible member upon rotation of said rotatable member from an "opened position" to a "closed position."

9. The adjustment mechanism of claim 8, wherein said peripheral surface of said rotatable member is configured to index with said flexible member as said at least a portion of said flexible member is drawn onto said peripheral surface upon said rotation of said rotatable member from said "opened position" to said "closed position."

10. The adjustment mechanism of claim 9, wherein said rotatable member is a sprocket, and wherein said flexible member is a chain.

11. The adjustment mechanism of claim 10, wherein said sprocket is a cam.

12. The adjustment mechanism of claim 6, wherein said connection link includes a removable locking member.

13. The adjustment mechanism of claim 12 further comprising a capturing device, said capturing device mounted adjacent to said rotatable member, said capturing device including a travel limit, said travel limit configured to control and limit travel of said concave toward said rotor of said combine upon said rotation of said rotatable member from said "opened position" to said "closed position."

14. The adjustment mechanism of claim 13, wherein said capturing device is non-rotatably mounted about said rotatable shaft.

15. The adjustment mechanism of claim 13, wherein said travel limit of said capturing device is a slot, said slot configured to securely receive said removable locking member of said connection link.

16. A combine for harvesting crop grain material comprising:
a mobile frame;
a crop harvesting mechanism supported on said frame to separate said crop grain material into a grain portion and a residue portion, said crop harvesting mechanism comprising:
a crop threshing rotor defining a circumference; and
a concave supported adjacent to said rotor and at least partially around said circumference thereof, said concave being spaced at a clearance spacing extending generally radially outward from said rotor, said concave being supported for movement relative to said rotor for adjustment of said clearance spacing; and
an adjustment mechanism for effecting movement and clearance spacing of said concave relative to said rotor, comprising:
at least one rotatable shaft;
at least one rotatable member, said rotatable member defining a peripheral surface, said rotatable member mounted on said rotatable shaft for rotation therewith; and
at least one linking assembly, said linking assembly including at least one flexible member, said linking assembly coupling said rotatable member to said concave.

17. The combine of claim 16, wherein said peripheral surface of said rotatable member receives at least a portion of said flexible member upon rotation of said rotatable member from an "opened position" to a "closed position."

18. The combine of claim 16, wherein said linking assembly further includes at least one rigid member, said rigid member coupling said flexible member to said concave.

19. The combine of claim 18, wherein said rigid member includes a first end and a second end, and wherein said flexible member includes a first end and a second end, said first end of said flexible member engaged with said rotatable member, said first end of said rigid member engaged with said concave, said second end of said rigid member engaged with said second end of said flexible member.

20. The combine of claim 19, wherein said second end of said flexible member includes a connection link, said connection link including a removable locking member, said rotatable member configured to accommodate at least a portion of said connection link upon said rotation of said rotatable member from said "opened position" to said "closed position."

21. The combine of claim 20 further comprising a capturing device, said capturing device mounted adjacent to said rotatable member, said capturing device including a travel limit, said travel limit configured to securely receive said removable locking member of said connection link and control and limit travel of said concave toward said rotor of said combine upon said rotation of said rotatable member from said "opened position" to said "closed position."

22. A combine for harvesting crop grain material comprising:
a mobile frame;
a crop-threshing rotor supported by said frame and defining a circumference;
a concave movably supported adjacent to said rotor and at least partially around said circumference thereof to thresh said crop grain therebetween, said concave being spaced at a clearance spacing extending generally radially outward from said rotor, said concave movable relative to said rotor for adjustment of said clearance spacing; and
an adjustment mechanism for effecting movement of said concave relative to said rotor, comprising:
at least one rotatable shaft; and
at least one rotatable member, said rotatable member defining a peripheral surface, said rotatable member mounted on said rotatable shaft for rotation therewith; and at least one linking assembly, said linking assembly including at least one flexible member, said linking assembly coupling said rotatable member to said concave.

23. The combine of claim 22, wherein said peripheral surface of said rotatable member receives at least a portion of said flexible member upon rotation of said rotatable member from an "opened position" to a "closed position."

24. The combine of claim 22, wherein said linking assembly further includes at least one rigid member, said rigid member coupling said flexible member to said concave.

25. The combine of claim 24, wherein said rigid member includes a first end and a second end, and wherein said flexible member includes a first end and a second end, said first end of said flexible member engaged with said rotatable member, said first end of said rigid member engaged with said concave, said second end of said rigid member engaged with said second end of said flexible member.

26. The combine of claim 25, wherein said second end of said flexible member includes a connection link, said connection link including a removable locking member, said rotatable member configured to accommodate at least a portion of said connection link upon said rotation of said rotatable member from said "opened position" to said "closed position."

27. The combine of claim 26 further comprising a capturing device, said capturing device mounted adjacent to said rotatable member, said capturing device including a travel limit, said travel limit configured to securely receive said removable locking member of said connection link and control and limit travel of said concave toward said rotor of said combine upon said rotation of said rotatable member from said "opened position" to said "closed position."

28. A method for effecting movement and clearance spacing of a concave relative to a rotor of a combine, the method comprising:
   providing a rotor having a longitudinal axis of rotation;
   providing at least one concave, said concave having a first end and a second end spaced circumferentially around said rotor, said first end of said concave pivotally mounted about a first pivot axis, said second end of said concave releasably mounted to an adjustment mechanism, said adjustment mechanism comprising:
   at least one rotatable shaft;
   at least one rotatable member, said rotatable member defining a peripheral surface, said rotatable member mounted on said rotatable shaft for rotation therewith; and
   at least one linking assembly, said linking assembly including at least one flexible member, said linking assembly coupling said rotatable member to said concave;
   receiving at least a portion of said flexible member at the peripheral surface of said rotatable member; and
   actuating said rotatable shaft to effect movement and clearance spacing of said concave relative to said rotor of said combine.

29. A method for effecting movement and clearance spacing of a concave relative to a rotor of a combine, the method comprising:
   providing a rotor having a longitudinal axis of rotation;
   providing at least one concave, said concave having a first end and a second end spaced circumferentially around said rotor, said first end of said concave pivotally mounted about a first pivot axis, said second end of said concave releasably mounted to multi-link adjustment mechanism;
   receiving at least a portion of a flexible member at the peripheral surface of a rotatable member of said adjustment mechanism; and
   actuating said adjustment mechanism to effect movement and clearance spacing of said concave relative to said rotor of said combine, said clearance spacing being sufficient for removal of lodged material between said rotor and said concave without disassembly of said concave.

* * * * *